United States Patent
Webb et al.

(10) Patent No.: US 9,800,997 B2
(45) Date of Patent: Oct. 24, 2017

(54) DERIVING AN INDICATION OF A COMMUNICATIONS PARAMETER USING REFERENCE SYMBOLS

(71) Applicant: SONY CORPORATION, Tokyo (JP)

(72) Inventors: Matthew William Webb, Weybridge (GB); Hideji Wakabayashi, Weybridge (GB); Stephen Truelove, Weybridge (GB)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 14/439,479

(22) PCT Filed: Nov. 26, 2013

(86) PCT No.: PCT/GB2013/053125
§ 371 (c)(1),
(2) Date: Apr. 29, 2015

(87) PCT Pub. No.: WO2014/096769
PCT Pub. Date: Jun. 26, 2014

(65) Prior Publication Data
US 2015/0289079 A1   Oct. 8, 2015

(30) Foreign Application Priority Data

Dec. 21, 2012   (GB) .................................. 1223313.6

(51) Int. Cl.
| | |
|---|---|
| H04L 5/00 | (2006.01) |
| H04W 4/00 | (2009.01) |
| H04L 27/26 | (2006.01) |
| H04J 11/00 | (2006.01) |
| H04W 84/04 | (2009.01) |
| H04L 1/00 | (2006.01) |

(52) U.S. Cl.
CPC ......... H04W 4/005 (2013.01); H04J 11/0069 (2013.01); H04L 5/005 (2013.01);
(Continued)

(58) Field of Classification Search
None
See application file for complete search history.

(56) References Cited

U.S. PATENT DOCUMENTS

| | | |
|---|---|---|
| 2008/0075184 A1 | 3/2008 | Muharemovic et al. |
| 2010/0067591 A1 | 3/2010 | Luo et al. |

(Continued)

FOREIGN PATENT DOCUMENTS

| | | |
|---|---|---|
| GB | 2487757 | 8/2012 |
| GB | 2487780 | 8/2012 |

(Continued)

OTHER PUBLICATIONS

British Search Report Issued Jun. 3, 2013 in British Patent Application No. GB1223313.6 dated Dec. 21, 2012.
(Continued)

*Primary Examiner* — Huy D Vu
*Assistant Examiner* — Bao G Nguyen
(74) *Attorney, Agent, or Firm* — Oblon, McClelland, Maier & Neustadt, L.L.P.

(57) ABSTRACT

A perturbation is made to contents and/or locations in time and frequency of Reference Signals (RS) transmitted by a cell, such that the perturbation implies information regarding a capability or configuration of the cell as regards availability or configuration of a network functionality, for example facility to offer a narrowband virtual carrier operation. The contents and/or locations in time and frequency of the reference signals used are typically based on the physical cell identity (PCI). In certain embodiments the PCI carried by some identifiable RS resources is changed: in others, the RS is transmitted in unexpected resources. The network functionality configuration information is inferred from the various relationships between these transmissions and the cell's actual PCI and/or expected RS transmission resources.

20 Claims, 15 Drawing Sheets

(52) U.S. Cl.
CPC ........ *H04L 27/2613* (2013.01); *H04L 1/0026* (2013.01); *H04L 5/0023* (2013.01); *H04L 5/0044* (2013.01); *H04L 5/0064* (2013.01); *H04L 5/0092* (2013.01); *H04W 84/04* (2013.01)

(56) References Cited

U.S. PATENT DOCUMENTS

| | | | |
|---|---|---|---|
| 2010/0232311 | A1 | 9/2010 | Zhang et al. |
| 2011/0310989 | A1* | 12/2011 | Kusano ............... H04L 1/0023 375/260 |
| 2012/0093021 | A1* | 4/2012 | Kim .................... H04J 13/0062 370/252 |
| 2012/0176939 | A1* | 7/2012 | Qu ....................... H04L 5/0023 370/255 |
| 2012/0236773 | A1* | 9/2012 | Shen .................... H04L 1/0028 370/311 |
| 2013/0003668 | A1 | 1/2013 | Xiao et al. |

FOREIGN PATENT DOCUMENTS

| | | |
|---|---|---|
| GB | 2487782 | 8/2012 |
| GB | 2487906 | 8/2012 |
| GB | 2487907 | 8/2012 |
| GB | 2487908 | 8/2012 |
| GB | 2487909 | 8/2012 |
| GB | 2488513 | 9/2012 |
| GB | 2493703 | 2/2013 |
| JP | 2005-151573 A | 6/2005 |
| JP | 2006-067262 A | 3/2006 |
| JP | 2010-509837 A | 3/2010 |
| WO | 2012 104629 | 8/2012 |
| WO | 2012/104633 A1 | 8/2012 |
| WO | 2012 149559 | 11/2012 |

OTHER PUBLICATIONS

"Digital cellular telecommunications system (Phase 2+); Universal Mobile Telecommunications System (UMTS); LTE; Service requirements for Machine-Type Communications (MTC); Stage 1 (3GPP TS 22.368 version 10.5.0 Release 10)"; ETSI TS 122 368 V10.5.0 Technical Specification, (Jul. 2011), (Total 18 pages).

International Search Report dated Feb. 6, 2014 in PCT/GB2013/053125 dated Nov. 26, 2013.

U.S. Appl. No. 14/441,068, dated May 6, 2015, Webb, et al.

Office Action issued Jul. 4, 2017 in Japanese Patent Application No. 2015-548745 (with partial English translation).

Office Action issued Aug. 18, 2017 in Great Britain Patent Application No. 1223313.6.

* cited by examiner

DERIVING AN INDICATION OF A COMMUNICATIONS PARAMETER USING REFERENCE SYMBOLS

CROSS-REFERENCE TO RELATED APPLICATION

The present application claims priority to British Patent Application 1223313.6, filed in the UK IPO on Dec. 21, 2012, the entire contents of which being incorporated herein by reference.

BACKGROUND OF THE DISCLOSURE

The present disclosure relates to methods, systems and apparatus for deriving an indication of a communications parameter at communications devices in a wireless communications system.

As network entities such as eNodeBs in wireless telecommunications systems are required to provide an increasing number of network functionalities, it becomes more important for each network entity to be able to indicate at least some of those functionalities at an appropriate point in the network signalling process. It is expected that network entities of differing network functionality capabilities will be deployed alongside one another in many wireless communications networks: as a result, a telecommunications device (i.e. a user equipment, UE) wishing to access a particular network capability cannot presume that any given network entity from which it requests such a service can actually deliver the service, and where the capability is absent, the UE must start over requesting the capability from a different network entity, incurring a penalty in terms of wasted time and processing power.

Certain classes of telecommunications device, such as MTC devices (e.g. semi-autonomous or autonomous wireless communication terminals), support "low capability" communication applications that are characterised, for instance, by the transmission of small amounts of data at relatively infrequent intervals. MTC devices are constructed so that individually they represent little burden on telecommunications networks and thus can be deployed in greater numbers than equivalent "full capability" terminals in the same networks.

To support MTC terminals, it has been proposed to introduce a "virtual carrier" operating within a bandwidth of one or more "host carriers": the proposed virtual carrier concept preferably integrates within the transmission resources of conventional OFDM based radio access technologies and subdivides frequency spectrum in a similar manner to OFDM. Unlike data transmitted on a conventional OFDM type downlink carrier, data transmitted on the virtual carrier can be received and decoded without needing to process the full bandwidth of the downlink OFDM host carrier.

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

"Virtual carrier" operation needs to be supported by a suitable "VC" functionality in the cell (i.e. provided by the serving network entity). Thus the initial procedures for a UE to access a cell could waste processing effort if a cell does not in fact support the VC. An MTC device is typically designed to operate with low power and long battery life, and it is therefore especially desirable to minimise such wasted effort in this case.

In current systems, the initial procedures are largely designed with the assumption that the UE certainly wishes to connect to the cell (unless it is barred in some way, by virtue of the public land mobile network operator (PLMN) identity, for example), but this may not be true for a UE with restricted capability. Particularly in MTC scenarios, there is the possibility of an event occurring that triggers many MTC UEs to try to connect with the network. This could overload the network and so it may be desirable to indicate to UEs that they should not even try to connect in order to save transmit power and processing power at the eNB and to reduce potentially significant interference.

The conventional initial procedure for cell acquisition does not currently have any facility for efficiently indicating such capabilities (or ability to offer such functionality).

An efficient communication of network entity capability within a wireless telecommunications system is therefore desirable.

SUMMARY OF THE DISCLOSURE

According to a first aspect of the disclosure there is provided a mobile terminal for deriving an indication of a communications parameter associated with a wireless communications system, the wireless communications system comprising:

one or more base stations, each of which includes a transmitter configured to provide a wireless access interface for communicating data to terminals, the wireless access interface providing a plurality of communications resource elements, the communications resource elements being assembled in a plurality of time divided radio frames, a first subset of the resource elements in each radio frame carrying at least one synchronisation signal, the synchronisation signals for a base station being associated with a first identity number, and a second subset of the resource elements in each radio frame carrying reference signals comprising reference symbols, the second subset being divided into a plurality of discrete configurations, including a first configuration and a second configuration, the reference symbols in the first configuration having at least one property that varies according to the first identity number, the mobile terminal having:

a receiver for receiving at least some of the communications resource elements of the wireless access interface and a processor for processing at least some of the received communications resource elements; wherein, in operation, the processor determines the values of at least one property of the reference symbols present in the received communications resource elements; the value of the communications parameter being inferred from at least one property of the reference symbols in the second configuration.

The communications parameter preferably corresponds to a static characteristic of the cell or network, such as a network capability (or absence of capability). Alternatively or additionally, the communications parameter preferably corresponds to a dynamic characteristic of the cell or network, such as network sharing and/or a real time network capability dependent upon cell traffic congestion levels. The communications system therefore provides the mobile terminal (UE) with information about the capability of the eNodeB in the early stages of the initial access procedure with a minimum of processing effort. In particular, the network capability may be the ability to implement a virtual carrier within the host carrier of the eNodeB concerned.

The UE can thus abandon the initial procedure in a cell which does not support VC operation, or which does not support it in a suitable configuration, or more generally in a cell the UE would prefer in advance to not attempt to connect to. Certain embodiments allow abandonment after extraction of a physical-layer cell identity (PCI) from the synchronisation signals. Other embodiments allow abandonment of cell acquisition once PBCH and MIB have been decoded. This represents a significant processing saving at the UE, which is significant in a power and battery-limited device such as those envisaged for MTC-type deployments. Particularly advantages accrue in network deployments where some but not all cells transmit a VC.

Conventional techniques such as access class barring are not available until the UE is already in the process of accessing the cell's resources and thus too late to avoid a waste of processing effort.

Various further aspects and embodiments of the disclosure are provided in the appended claims.

It will be appreciated that features and aspects of the disclosure described above in relation to the first and other aspects of the disclosure are equally applicable and may be combined with embodiments of the disclosure according to the different aspects of the disclosure as appropriate, and not just in the specific combinations described above.

BRIEF DESCRIPTION OF DRAWINGS

Embodiments of the present disclosure will now be described by way of example only with reference to the accompanying drawings where like parts are provided with corresponding reference numerals and in which.

DETAILED DESCRIPTION

Figure 1:
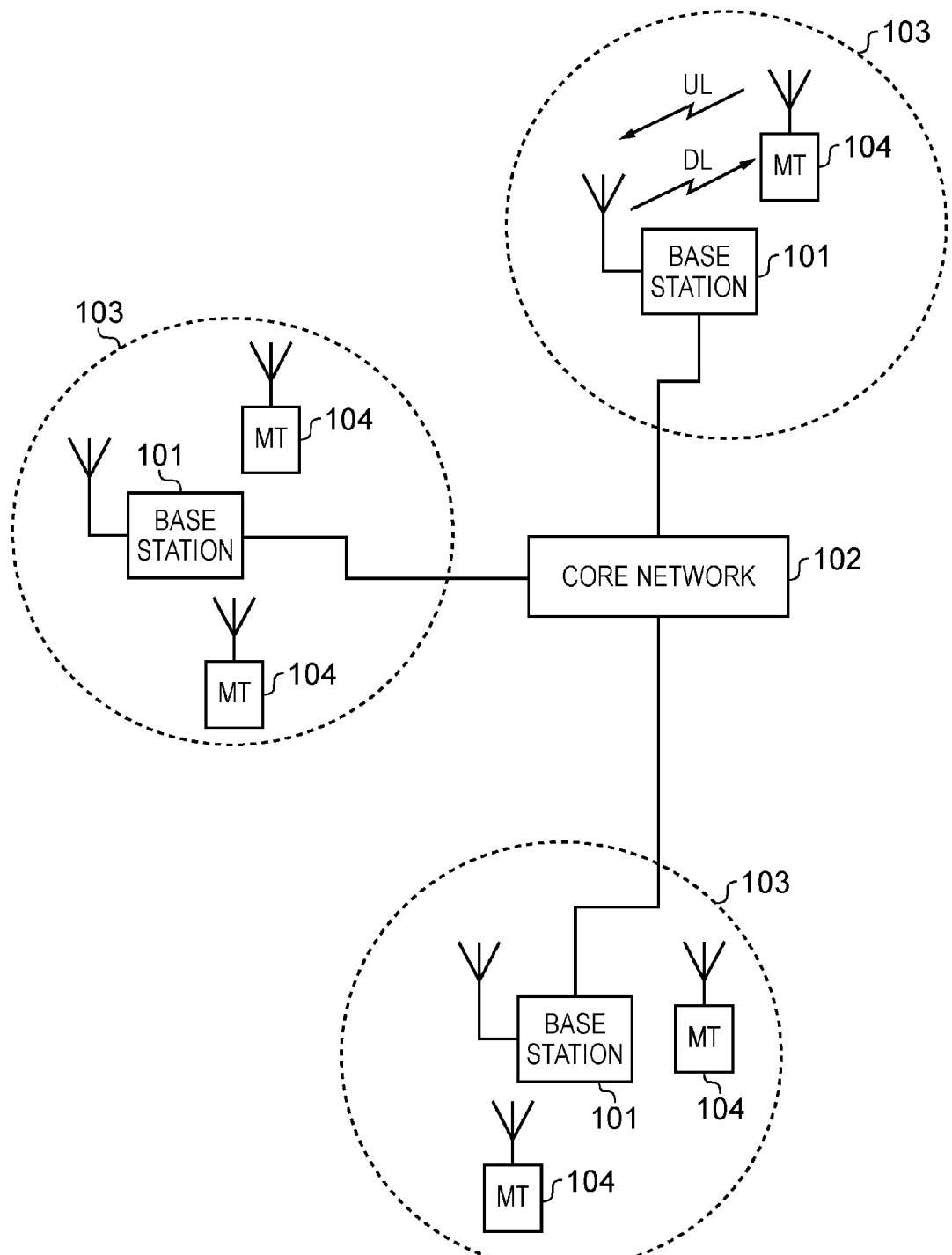
FIG. 1 provides a schematic diagram illustrating an example of a conventional mobile telecommunication network.

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from terminal devices (also referred to as mobile terminals, MT or User equipment, UE) 104. Data is transmitted from base stations 101 to terminal devices 104 within their respective coverage areas 103 via a radio downlink. Data is transmitted from terminal devices 104 to the base stations 101 via a radio uplink. The core network 102 routes data between the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplexing (OFDM) based interface for the radio downlink (so-called OFDMA) and the radio uplink (so-called SC-FDMA).

Figure 2:
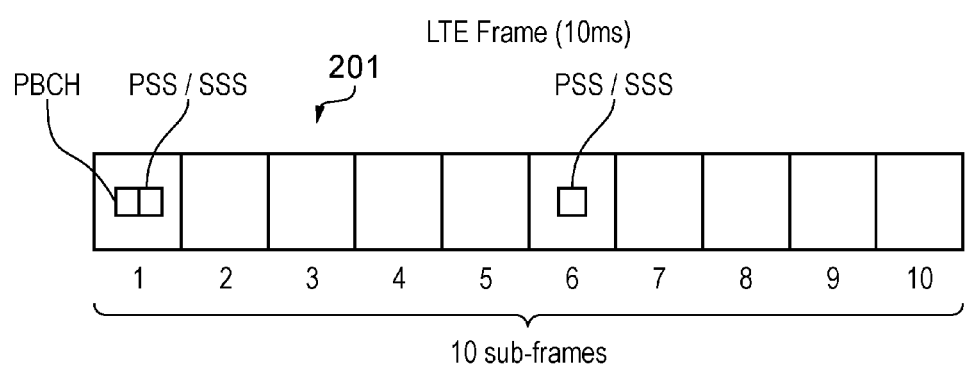
FIG. 2 provides a schematic diagram illustrating a conventional LTE radio frame.

FIG. 2 shows a schematic diagram illustrating an OFDM based LTE downlink radio frame 201. The LTE downlink radio frame is transmitted from an LTE base station (known variously as an enhanced Node B, "eNodeB" or "eNB"—these terms being synonymous) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
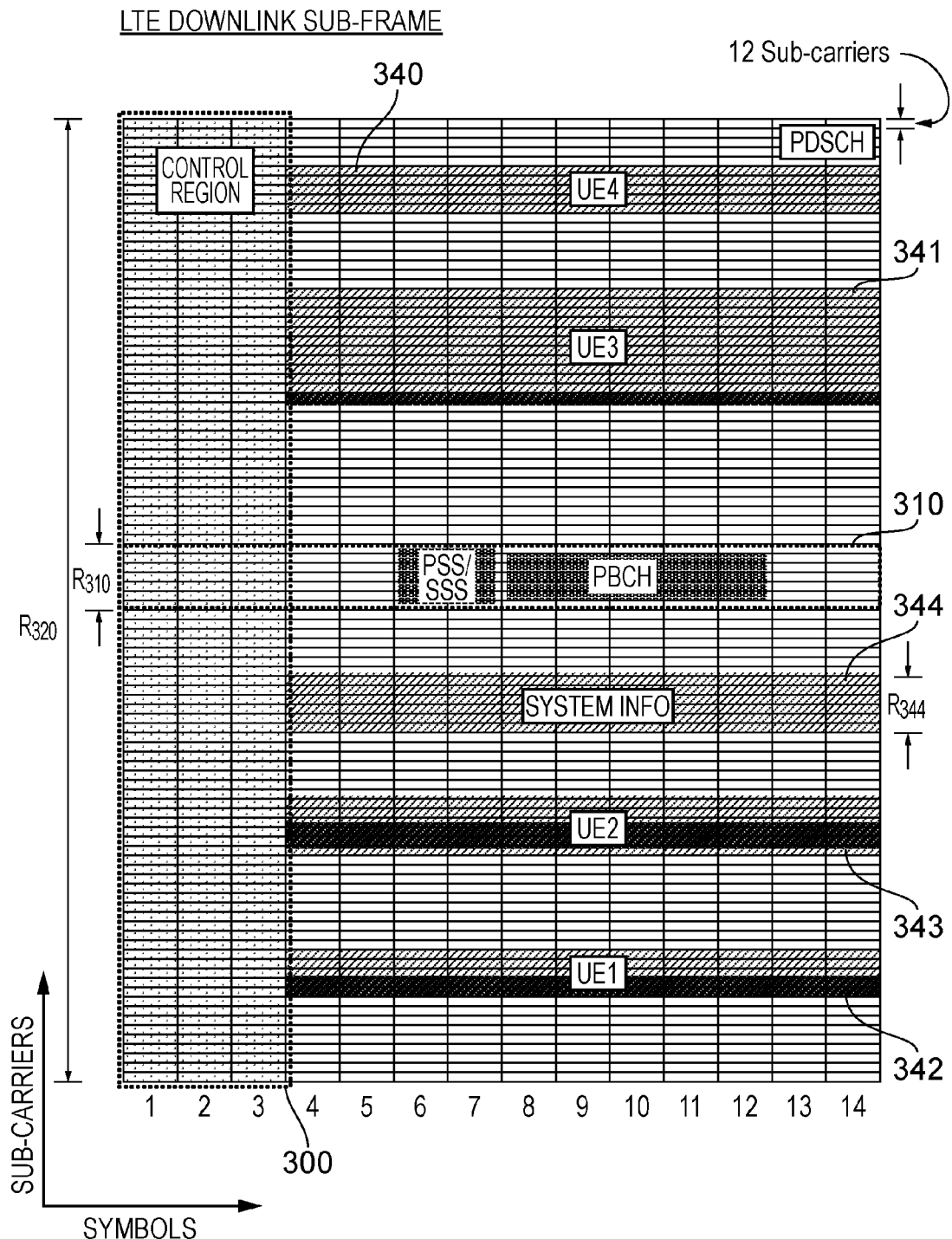
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of "symbols", which are transmitted over a 1ms period. Each symbol comprises a predetermined number of orthogonal sub-carriers distributed across the bandwidth of the downlink radio carrier. Here, the horizontal axis represents time while the vertical represents frequency.

The example sub-frame shown in FIG. 3 comprises 14 symbols and 1200 sub-carriers spread across a 20 MHz bandwidth, $R_{320}$. The smallest allocation of user data for transmission in LTE is a "resource block" comprising twelve sub-carriers transmitted over one slot (0.5 sub-frame). Each individual box in the sub-frame grid in FIG. 3 corresponds to twelve sub-carriers transmitted on one symbol, thus a single row in FIG. 3 corresponds to two resource blocks.

Control data may be allocated in units smaller than a resource block—the smallest allocation for transmission in LTE being a "resource element". The term "resource element" refers to the data on one subcarrier in one symbol.

Control data, such as reference signals may be allocated specific resource elements within resource blocks.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the region of resources identified by reference numeral 342, that UE2 has been allocated the region of resources identified by reference numeral 343, and so on.

PCFICH contains control data indicating the size of the control region (i.e. between one and three symbols, or two and four in the case of channel bandwidths of 1.4 MHz).

PHICH contains HARQ (Hybrid Automatic Request) data indicating whether or not previously transmitted uplink data has been successfully received by the network.

Symbols in the central band 310 of the time-frequency resource grid are used for the transmission of information including (in the first and sixth subframes) the primary synchronisation signal (PSS), the secondary synchronisation signal (SSS) and the primary broadcast channel (PBCH). This central band 310 is typically 72 sub-carriers wide (corresponding to a transmission bandwidth of 1.08 MHz). The PSS and SSS are synchronisation signals that, once detected, allow an LTE terminal device to achieve frame, subframe, slot and symbol synchronisation and determine the cell identity (PCI) of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH 344 containing system information and extending over a bandwidth of $R_{344}$. Distributed across the subframes within conventional LTE radio frames there will be reference signals (RS): these are discussed further below but not shown in FIG. 3 in the interests of clarity.

Machine Type Communication (MTC) Devices

As mentioned above, the anticipated widespread deployment of third and fourth generation networks has led to the parallel development of a class of devices and applications which, rather than taking advantage of the high data rates available, instead take advantage of the robust radio interface and increasing ubiquity of the coverage area. This parallel class of devices and applications includes MTC devices and so-called machine to machine (M2M) applications, wherein semi-autonomous or autonomous wireless communication devices typically communicate small amounts of data on a relatively infrequent basis.

Examples of MTC (and M2M) devices include: so-called smart meters which, for example, are located in a customer's house and periodically transmit information back to a central MTC server data relating to the customers consumption of a utility such as gas, water, electricity and so on; "track and trace" applications such as transportation and logistics tracking, road tolling and monitoring systems; remote maintenance and control systems with MTC-enabled sensors, lighting, diagnostics etc.; environment monitoring; point of sales payment systems and vending machines; security systems, etc.

Further information on characteristics of MTC-type devices and further examples of the applications to which MTC devices may be applied can be found, for example, in the corresponding standards, such as ETSI TS 122 368 V10.530 (2011-07)/3GPP TS 22.368 version 10.5.0 Release 10) [1].

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation terminal device such as a smartphone, an MTC-type terminal is preferably relatively simple and inexpensive: in addition MTC-devices are often deployed in situations that do not afford easy access for direct maintenance or replacement—reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, there is a desire to optimise the use of the available bandwidth in a telecommunications system supporting such devices.

In many scenarios, providing low capability terminals, such as these, with a conventional high-performance LTE receiver unit capable of receiving and processing (control) data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal.

Virtual Carrier Concept

A "virtual carrier" tailored to low capability terminals such as MTC devices is thus provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

The term "virtual carrier" corresponds in essence to a narrowband allocation for MTC-type devices within a host carrier for an OFDM-based radio access technology (such as WiMAX or LTE).

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference. For ease of reference, however, an overview of certain aspects of the concept of virtual carriers is set out in Annex 1.

As explained above, in OFDM-based mobile communication systems such as LTE, downlink data is dynamically assigned to be transmitted on different sub-carriers on a sub-frame by sub-frame basis. Accordingly, in every sub-frame, the network signals which sub-carriers on which symbols contain data relevant to which terminals (i.e. downlink grant signalling).

Initial Procedures for Cell Acquisition

The procedure followed by a UE to initially acquire a cell has been discussed in detail in GB 1113801.3 [10] (also referred to as a "camp-on" process), and so is not treated in detail here. The procedure can be summarised as follows:
i) Frequency acquisition.
ii) Primary Synchronisation Signal acquisition (subframe, slot and symbol timing acquired, Secondary Synchronisation Signal scrambling code acquired).
iii) Secondary Synchronisation Signal acquisition (frame timing acquired, Cell Group ID sequence acquired).
iv) From PSS and SSS, physical-layer cell identity (PCI) can be calculated.
v) From the PCI, cell-specific reference signal (CRS) location can be determined.
vi) Decode PBCH and MIB.
vii) Decode PCFICH and detect how many symbols are allocated for PDCCH.
viii) Decode DCI for SIB1 from PDCCH.
ix) Decode SIB1 and get the scheduling information for other SIBs.
x) Decode SIBs (other than SIB1).

Figure 5:
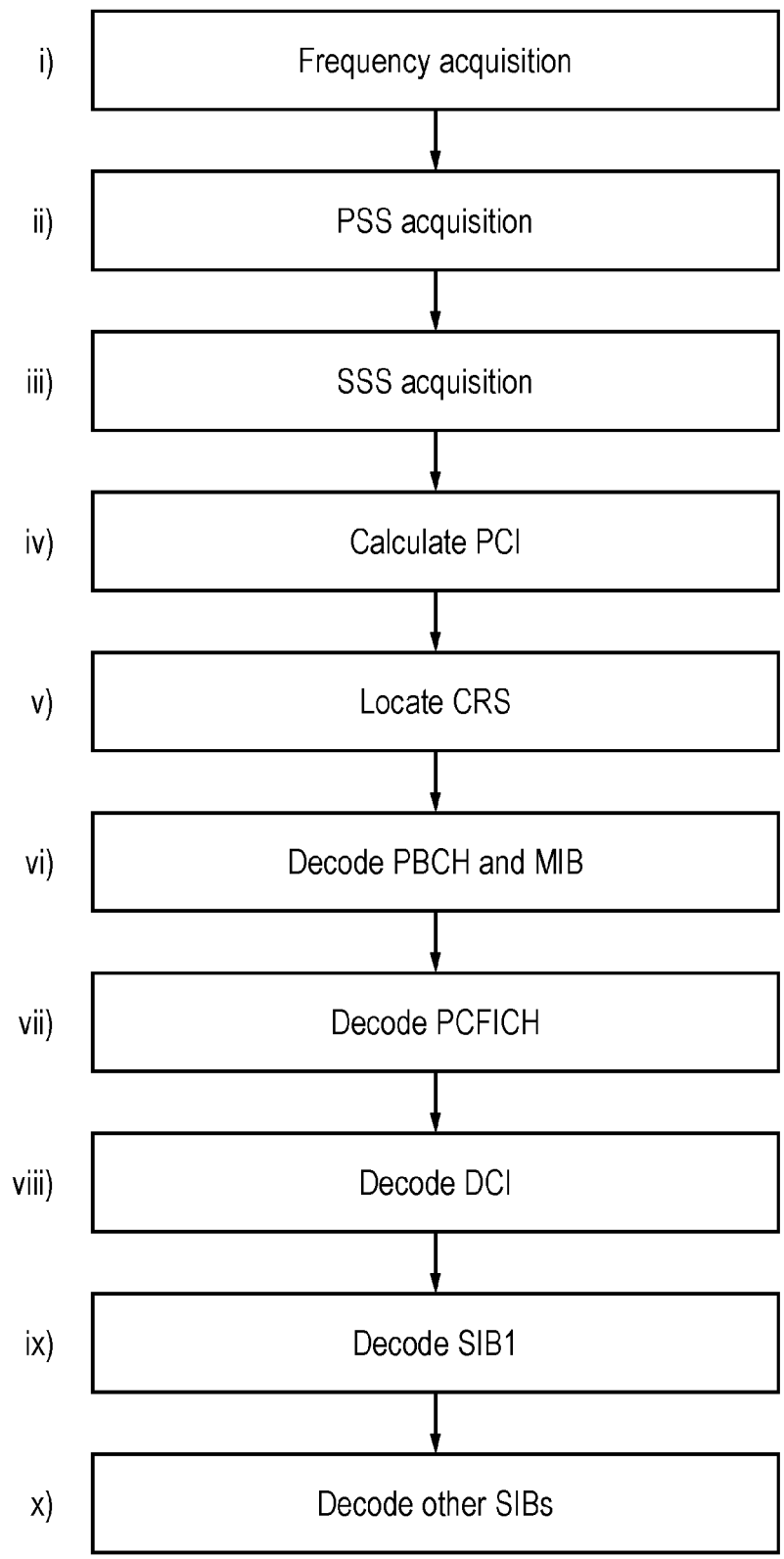
FIG. 5 illustrates the initial steps taken by a UE in conventional LTE prior to and during cell acquisition.

These steps are illustrated in FIG. 5.

Cell Identity

In LTE, each cell has an associated physical-layer cell identity (PCI). There are 504 PCIs, made up of 168 groups each containing three identities. They are extracted by processing a combination of the primary and secondary synchronization sequences (PSS and SSS)—transmitted in the first and sixth sub-frames of the LTE frame in each cell in FDD: the PSS being used to deduce one of the three identities within a group of PCIs and the SSS being used to deduce one of the 168 groups (step iv) in FIG. 5). A conventional LTE network is planned on a cell ID basis since the PCIs, when embedded in PSS/SSS transmissions, have good de-correlation properties allowing UEs to detect differing cell identities in deployments with frequency reuse factor 1.

Reference Signals

3GPP TS 36.211 (version 11.0.0) specifies various downlink reference signals (RSs) which may be transmitted by an eNodeB (eNB): of particular interest in the following discussion are the cell-specific reference signals (CRS) and channel-state information reference signals (CSI-RS). Each RS makes use of a subset of antenna ports. Antenna ports are mapped onto physical antennas in different ways depending upon the type of antenna: nonetheless antenna ports represent the downlink transmissions from the perspective of the UE.

Releases 8 (and later) of the relevant 3GPP standard mandate cell-specific reference signals (CRS). CRS are defined on up to four antenna ports (ports 0 to 3) and are broadcast in a cell in every subframe and every resource block. The pseudo-random sequence used to generate the CRS is a function of, at least, the cell's PCI (described in 3GPP TS 36.211 at section 6.10.1.1).

Figure 11:
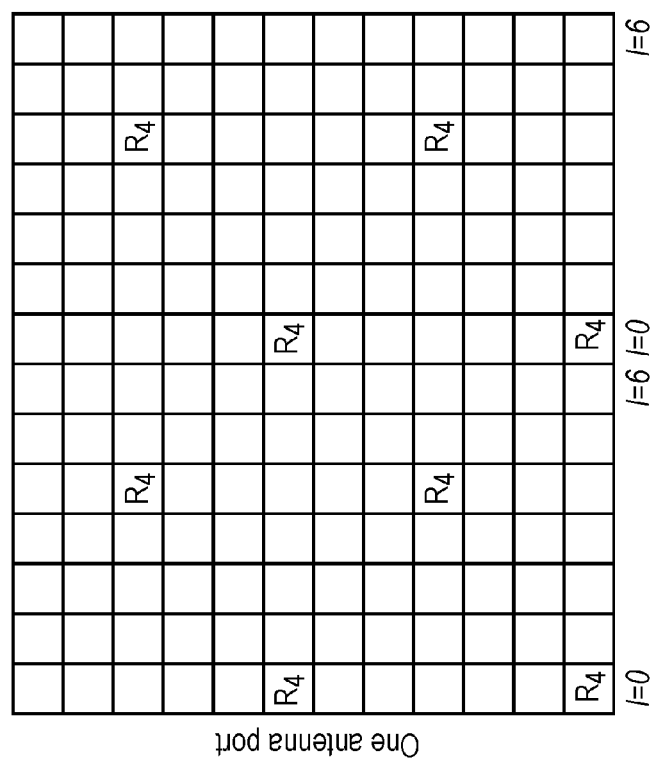
FIG. 11 shows configurations of CRS resource elements in a downlink subframe in cases where one, two and four antenna ports are used.
Figure 11:
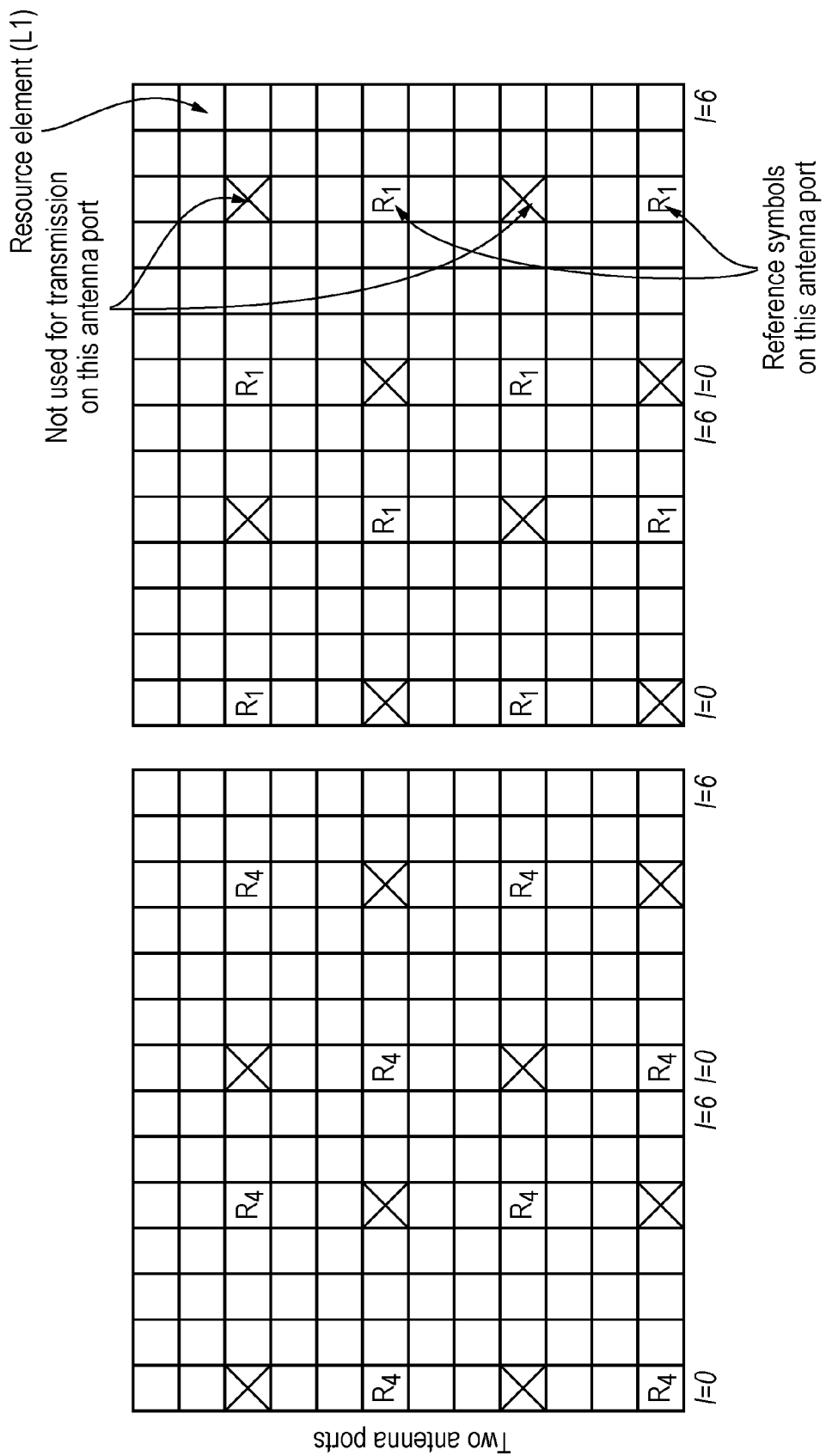
Figure 11:
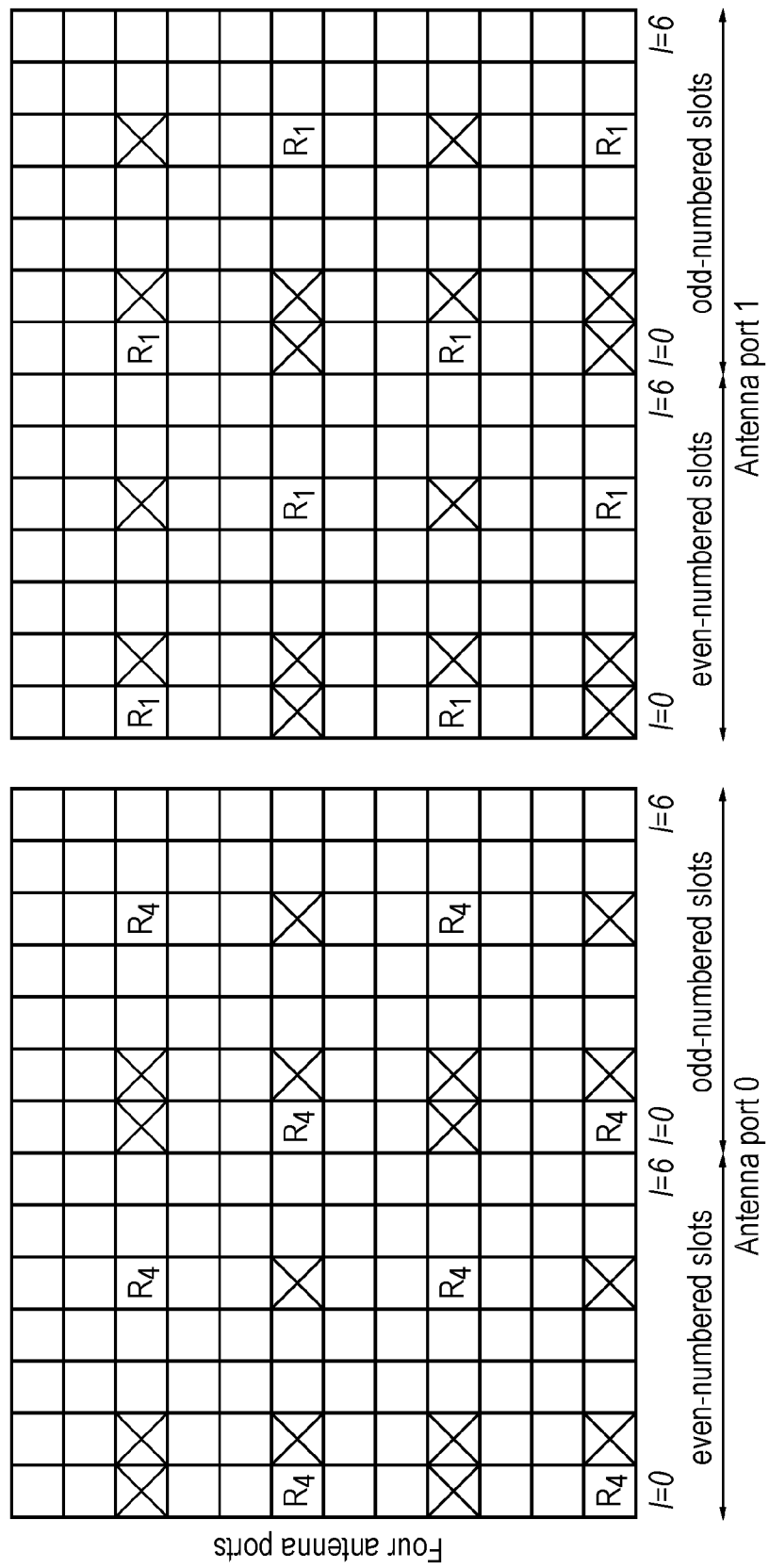
Figure 11:
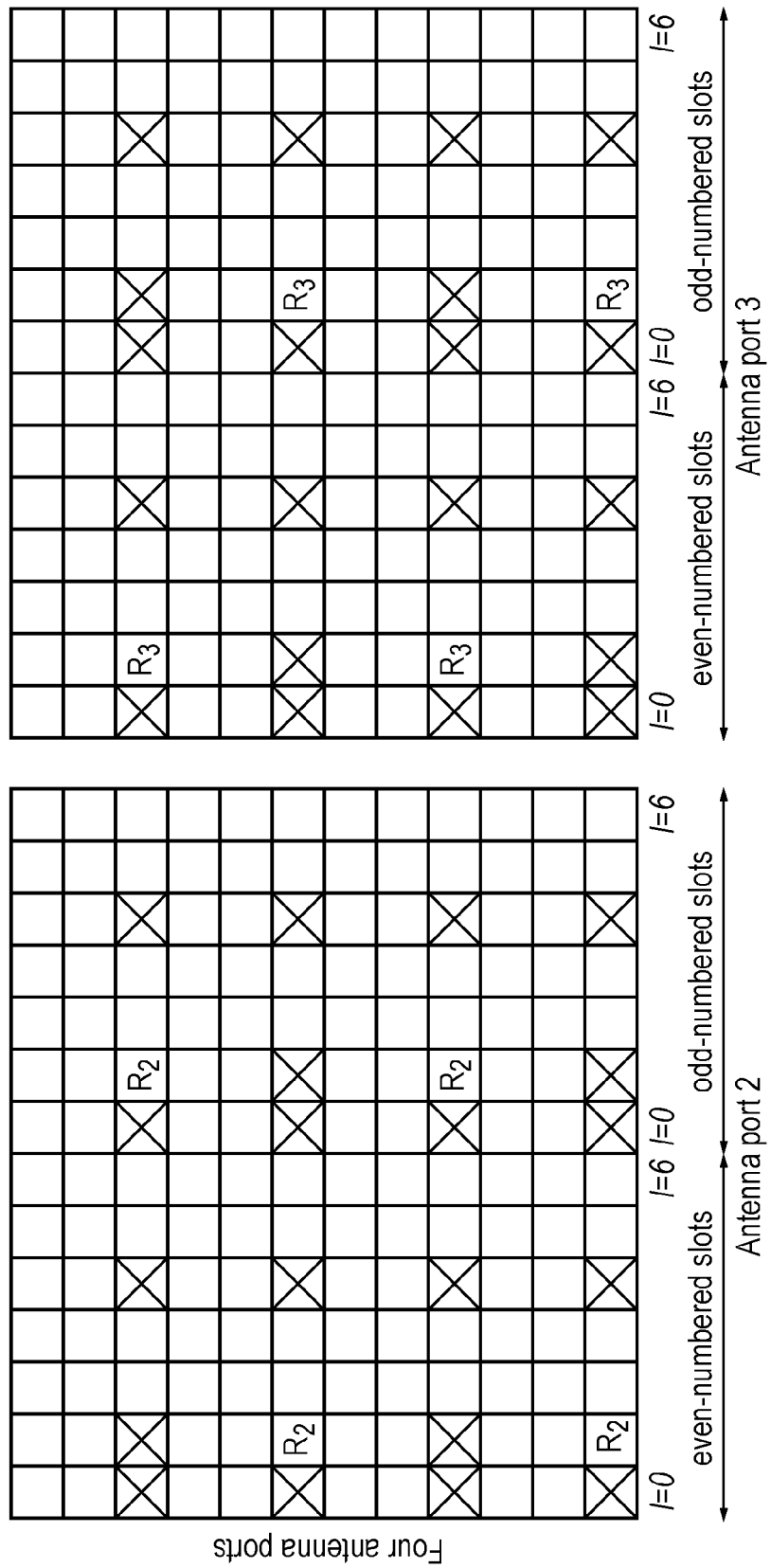

Furthermore, in current systems, CRS on a given antenna port are transmitted in the same OFDM symbols in every subframe, but the subcarriers in a resource block on which they are transmitted are offset from a base position. FIG. 11 shows the CRS locations on up to 4 antenna ports for $v_{shift}=0$. The offset corresponds to a vertical shift in the position of the Reference Symbols of FIG. 11—according to the following equation:

$$v_{shift}=N_{ID}^{cell} \bmod 6$$

where the $N_{ID}^{cell}$ is the PCI (the Figure being derived from 3GPP TS 36.211). In other words, the vertical shift of the subcarriers is a function of the PCI (this is not shown in FIG. 11 but is described in 3GPP TS 36.211 at section 6.10.1.2).

Release 10 and subsequent 3GPP standards introduce another RS that may be transmitted by an eNB: channel-state information reference signals (CSI-RS). CSI-RS are defined on up to eight antenna ports (ports 15 to 22) and occupy resource elements within a subframe which would otherwise be allocated to PDSCH (see FIG. 3) and are therefore useful in providing meaningful channel quality measurements.

The configuration of CSI-RS is signalled to UEs via radio resource control signalling (RRC) and includes the following, see TS 36.331:
A configuration of which resource elements (REs) the UE can assume CSI-RS to occur in (the 'CSI-RS configuration')—the standard specifies 32 such configurations where there are 14 symbols to each subframe;
A configuration of which subframes the UE can assume CSI-RS will in fact be transmitted in (the 'CSI-RS subframe configuration')—the subframe configuration defines the periodicity with which the CSI-RS is transmitted and the number of subframes by which the subframes in which the CSI-RS are transmitted are offset relative to the beginning of radio frames with system frame number (SFN)=0; and
The number of CSI-RS antenna ports in use: 1, 2, 4 or 8.

The sequence transmitted in the CSI-RS comes from a pseudo-random sequence generator defined in specifications. The initialisation of this generator is dependent upon the PCI and the transmitted sequence is thus a function of the PCI.

Perturbations to Reference Signals

To provide UEs attempting cell acquisition with timely information concerning the capability of the eNodeB, it has been recognised that certain "perturbations" to the contents or locations of RSs transmitted by a cell may be used to imply or signify information regarding the capability or configuration of the cell, such as the availability or configuration of VC operation. The terms "communication parameter" and "static characteristic", used interchangeably hereafter, both encompass such cell capabilities and configurations.

As noted above, the contents of the RSs used are typically based on the cell's PCI, so in some embodiments the PCI carried by some identifiable RS resources is changed, or the RS is transmitted in 'unexpected' resources, the various relationships between these transmissions and the cell's actual PCI and/or 'expected' RS transmission resources conveying the VC configuration information.

An eNodeB has no way of directly configuring a UE regarding the application of such perturbations in a cell since the embodiments operate before the UE can receive suitable signalling, e.g. RRC signalling, from the cell: in other words the operation of these embodiments is transparent to the UEs. As a result, the application of perturbations to reference signals may also be implemented to indicate other types of communication parameters by linking the perturbations in standards specifications to, for example, particular UE category/ies and only UEs of the relevant category/ies and interpreting cell transmissions in accordance with that linkage. As will be readily appreciated, the network operator would need to plan these aspects of their network in a suitable manner.

We now describe certain exemplary embodiments relating to the indication of virtual carrier (VC) capability in a cell. References to a UE are thus to a UE supporting operation on a VC, unless indicated otherwise.

VC Configuration Indication by CSI-RS Identity Partitioning

Figure 7:
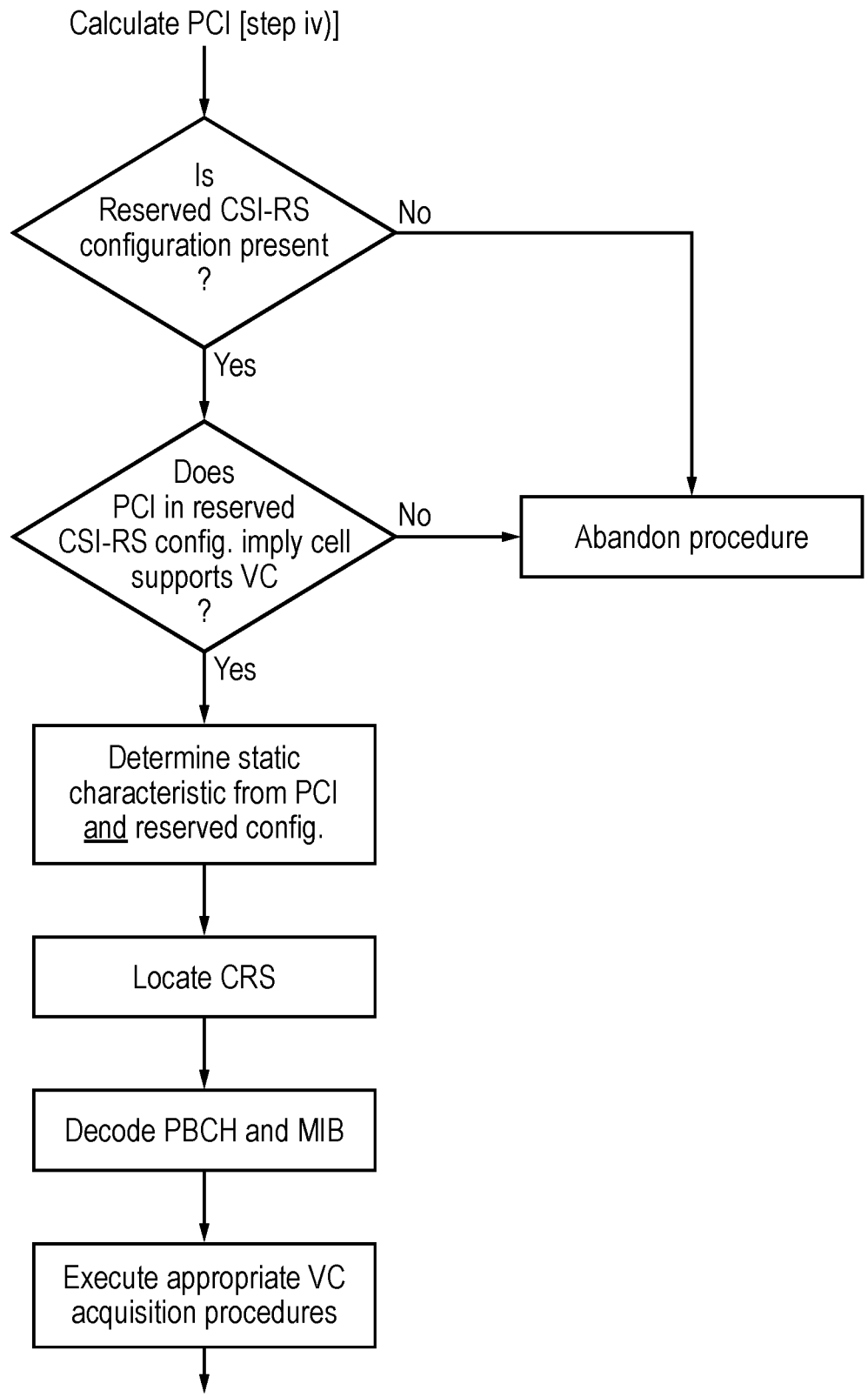
FIG. 7 illustrates the steps taken by a UE using CSI-RS values in accordance with a first embodiment prior to and during cell acquisition.

In a first embodiment, illustrated in FIG. 7, a given capability of the cell may be marked by altering ("perturbing") the way reference signals transmitted on a reserved CSI-RS configuration are generated. At least one among the CSI-RS configurations in Table 6.10.5.2-1 or Table 6.10.5.2-2 of TS 36.211 as appropriate is reserved for use in the application of a perturbation. In this reserved resource configuration is transmitted a reference signal with the initialisation of the reference signal generation sequence based on a PCI other than the cell's PCI: typically the "mismatched PCI" would be either a reserved PCI not associated with any geographically nearby cell from which the UE is likely to receive transmissions, or a PCI reserved in the entire network. This means that, in the equation for sequence generation in TS 36.211 Section 6.10.5.1, the quantity $n_{ID}$ is different from the cell's PCI, $N_{ID}^{cell}$. In the resulting expression for $c_{init}$, reproduced below, $n_{ID}$ is replaced by the reserved PCI value, $n_{ID}^{reserved}$, in both occurrences:

$$c_{init}=2^{10}\cdot(7\cdot(n_s+1)+l+1)\cdot(2\cdot n_{ID}+1)+2\cdot n_{ID}+N_{CP}.$$

A UE would need to search each potential reserved CSI-RS configuration with each reserved PCI value in order to determine what combination is in use. It could therefore be preferable to keep the reserved sets as small as possible.

Variations upon the subsequent capability detection process include the following steps, set out here in no particular order:

1. The presence of a reserved or mismatched PCI in a reserved CSI-RS configuration implies a static characteristic(s) of the VC, either on its own or by reference to the actual PCI of the cell, communicated in the PSS/SSS.
2. The presence of a reserved or mismatched PCI in a reserved CSI-RS configuration implies a static characteristic(s) of the VC jointly with the configuration in which it is found.
3. If there is more than one reserved CSI-RS configuration, they may contain different (reserved or mismatched) PCIs, different to that of the transmitting cell and different from one another, such pairings signifying different static characteristic(s) of the transmitting cell.

The above variations of this embodiment may be combined.

PCI values, as used in this embodiment, may be mapped individually to states or values of the static characteristic(s). Alternatively, groups (also referred to as 'partitions') of PCI values could be associated with such states or values.

A mobile network operator (MNO) would need to plan cell IDs such that cells do not transmit, as their actual identity, the same PCI as is in use in a reserved CSI-RS configuration in nearby cells.

Examples of static characteristics whose states or values might be indicated by the presence of a particular PCI (or PCI partition) in a particular reference signal configuration include:

- Whether or not the cell is, or is capable of, transmitting a VC.
- The location in the frequency domain of a principal VC that all VC UEs should attempt to decode first.
- The partition could indicate a static element of a reference signal configuration unique to the VC operation in the cell, such as a CSI-RS configuration.
- UEs may be pre-configured at the time of installation/manufacture to give preference to radio access on cells transmitting PCIs belonging to certain partitions, e.g. at night when general network load may be reduced. Such UEs can take this information into account when deciding whether to request resource from the network. This is relevant to MTC devices generally, whose data is often not time bounded.
- Whether the cell is operating network sharing, so that the UE may have some early indication of the likely traffic loading on the cell.

In one example, a cell transmitting in a reserved CSI-RS configuration a mismatched PCI from a first partition can be assumed by the UE to not support VC operation while a cell transmitting a PCI from a second partition can be assumed by the UE to support VC operation. A UE operable only in VC compliant cells would need to abandon the initial procedures in the case that the cell does not support VC and try to acquire another cell. A UE operable optionally in VC compliant cells but also in non-VC compliant cells would be left with an implementation choice as to whether to abandon the cell or continue. UEs unaware of the significance of the transmission of a mismatched PCI from a first partition in a reserved CSI-RS configuration would simply continue with the conventional, initial procedures.

The association between CSI-RS configuration, PCI and a static characteristic, such as existence or not of a VC, could be defined in specifications, and the deployment of a network in accordance with this embodiment would require planning by the MNO to ensure that cell IDs are assigned correctly.

FIG. 7 illustrates the differences in UE procedure for a terminal operable in accordance with the first embodiment. The 'appropriate VC acquisition procedures' depend on which implementation of VC is in use in the cell and/or are known of by the UE. Should the UE decide to abandon the procedure on a given cell, it would be expected to begin the procedure again on an alternative cell. On such an alternative cell, it may already have proceeded as far as determining the normal PCI so that it can, for example, make radio resource management (RRM) measurements on a neighbouring cell.

The system thus introduces a notion of transmitting a reserved CSI-RS with a different PCI value to that of the cell making the transmissions, where that different PCI value, either jointly with the cell's PCI or alone, implies information about the nature of the cell's transmissions and/or capabilities.

VC Configuration Indication by CSI-RS Configuration-Only Partitioning

Figure 8:
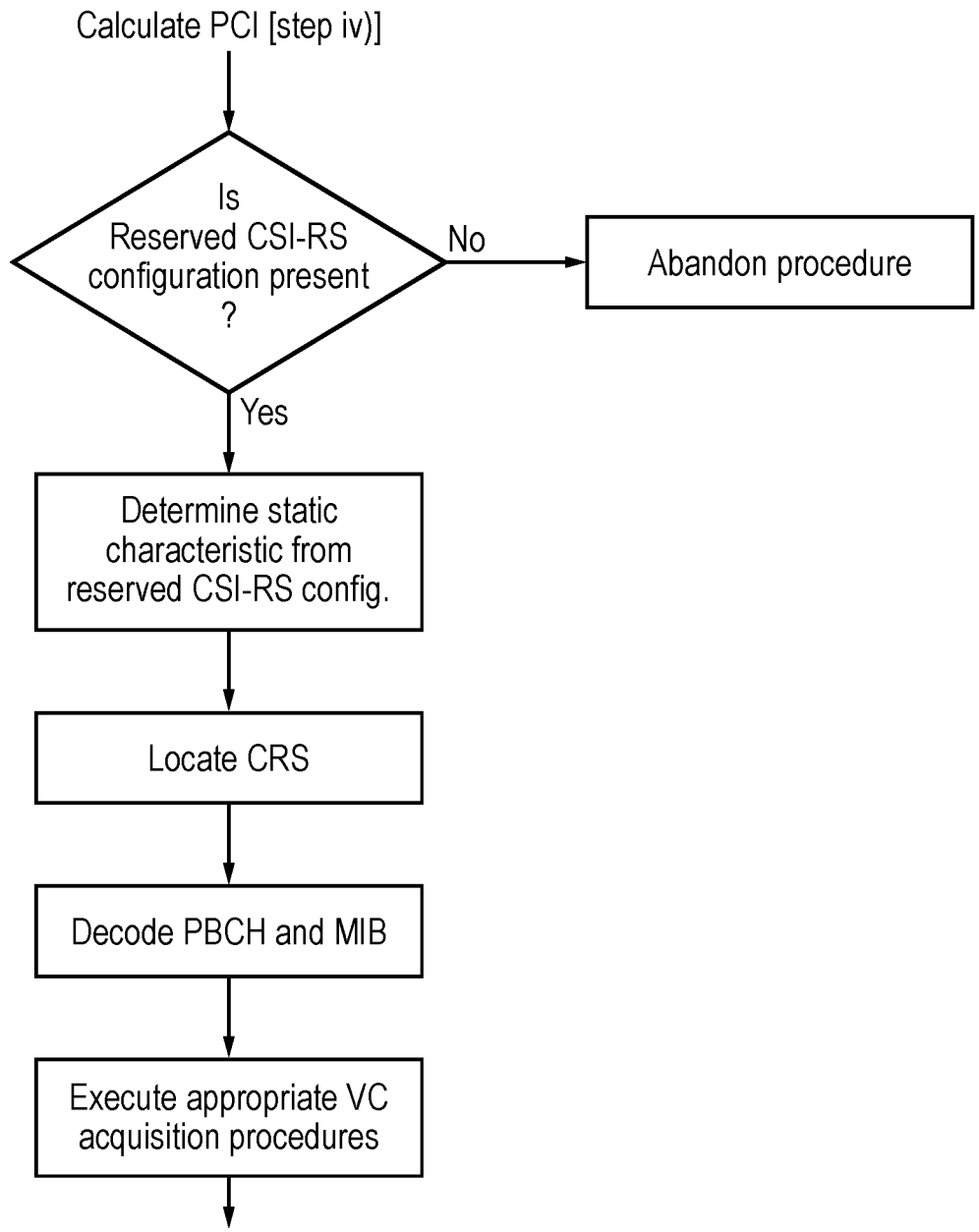
FIG. 8 illustrates the steps taken by a UE using CSI-RS values in accordance with a second embodiment prior to and during cell acquisition.

A second embodiment, illustrated in FIG. 8, bears similarity with the first embodiment: it differs in that the reference symbol scrambling sequence generated using the cell's usual PCI is always transmitted in the reserved CSI-RS configuration, (no mismatched PCI is used) and the static characteristic is indicated simply by which reserved CSI-RS configuration the UE detects. Therefore, UEs can search among the specified set of reserved configurations to see if one or more of them is being transmitted by a cell, thus inferring the static characteristic(s). CSI-RS configurations can be planned by network operators so this embodiment can be readily realised and inter-cell interference avoided by suitable network design.

VC Configuration Indication by CSI-RS Subframe Configuration

Figure 9:
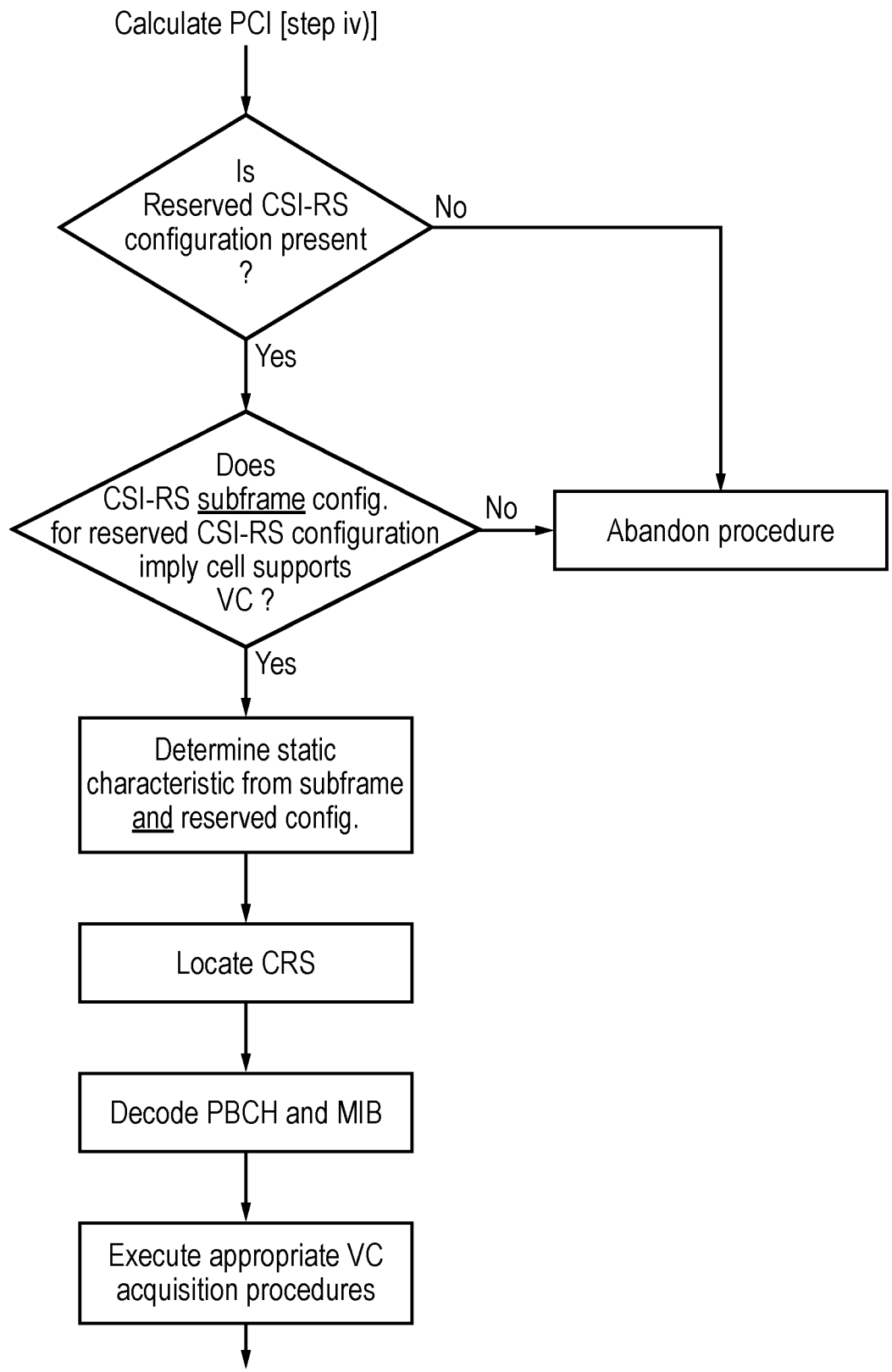
FIG. 9 illustrates the steps taken by a UE using CSI-RS values in accordance with a third embodiment prior to and during cell acquisition.
Figure 10:
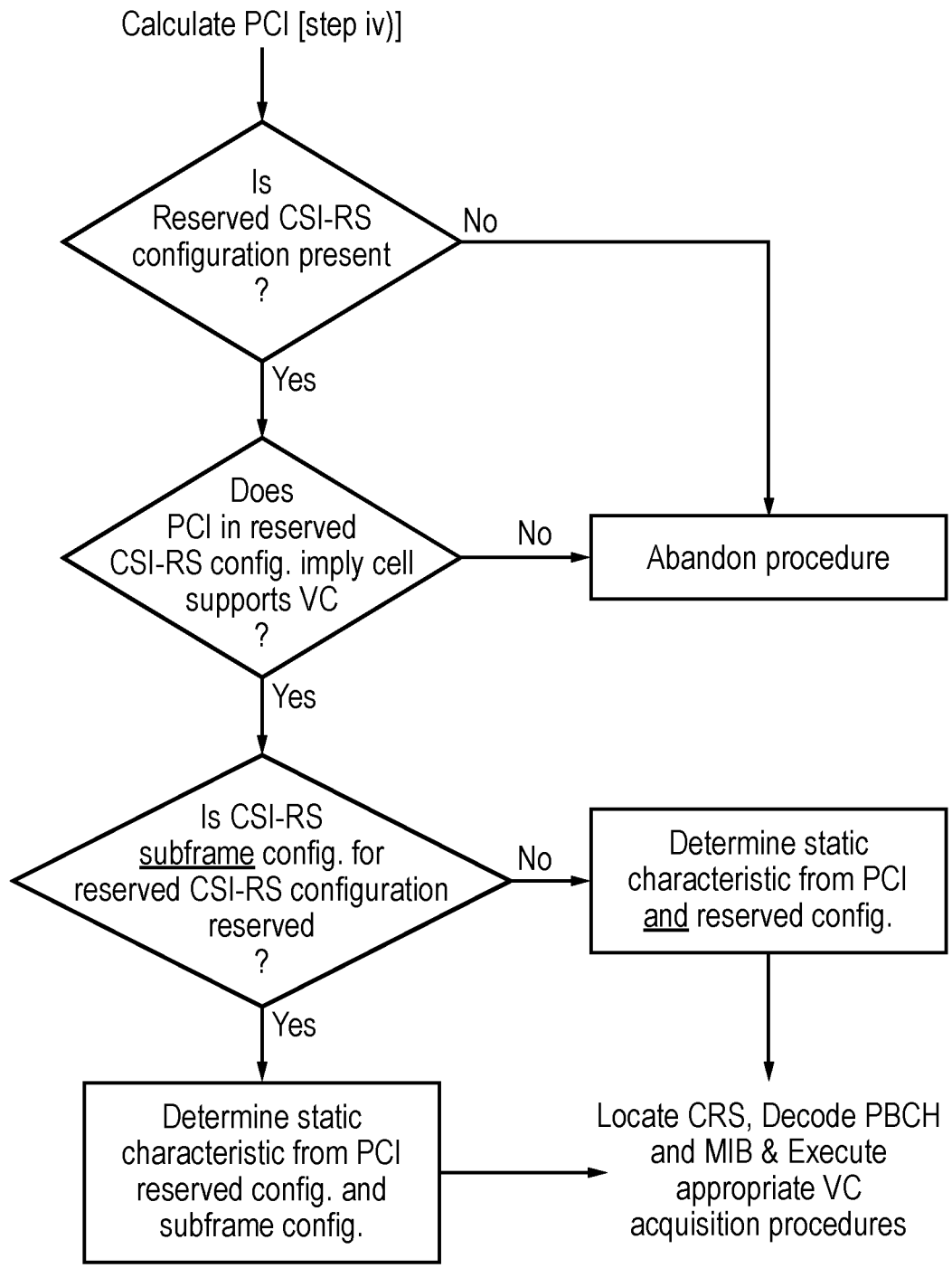
FIG. 10 illustrates the steps taken by a UE in accordance with a combination of the features of the first and third embodiments prior to and during cell acquisition.

A third embodiment, versions of which are illustrated in FIGS. 9 and 10, follows the same path as the first and second embodiments above in that at least one reserved CSI-RS configuration is used. In this embodiment, however, a static characteristic can be indicated by virtue of the subframe CSI-RS configuration associated with the (or each) reserved CSI-RS configuration.

In the version of the third embodiment illustrated in FIG. 9, the CSI-RS configuration detected is tested to confirm firstly whether that configuration is reserved and if so whether the subframe CSI-RS configuration associated with the reserved CSI-RS configuration implies VC capability. In this version, it is assumed (without limitation) that PCI partitioning is not in use in this network.

In the alternative version of the third embodiment illustrated in FIG. 10, an example is given of UE procedure when both PCI partitioning and CSI-RS reservation are in use. The first and third embodiments are thus combined. This example does not however limit the combination of the two embodiments to this particular implementation: the "decision" steps of the UE procedure (represented as diamonds with conditional outcomes "YES" and "NO") may for instance be approached in different order without departing from the scope of the embodiment.

The subframe configuration (from Table 6.10.5.3-1 of TS 36.211) of the CSI-RS is thus an additional factor so that only a CSI-RS configuration occurring with a particular subframe CSI-RS configuration and, depending upon which embodiment is being extended, a different PCI value to that in use in the cell, indicates a static characteristic of the VC.

Unlike conventional techniques, certain embodiments of the system described above provide a reserved CSI-RS configuration (and/or subframe CSI-RS configuration) for the purpose of indicating the nature of the cell's transmissions prior to RRC connection establishment.

VC Configuration Information by CRS Resource Shifting

Figure 12:
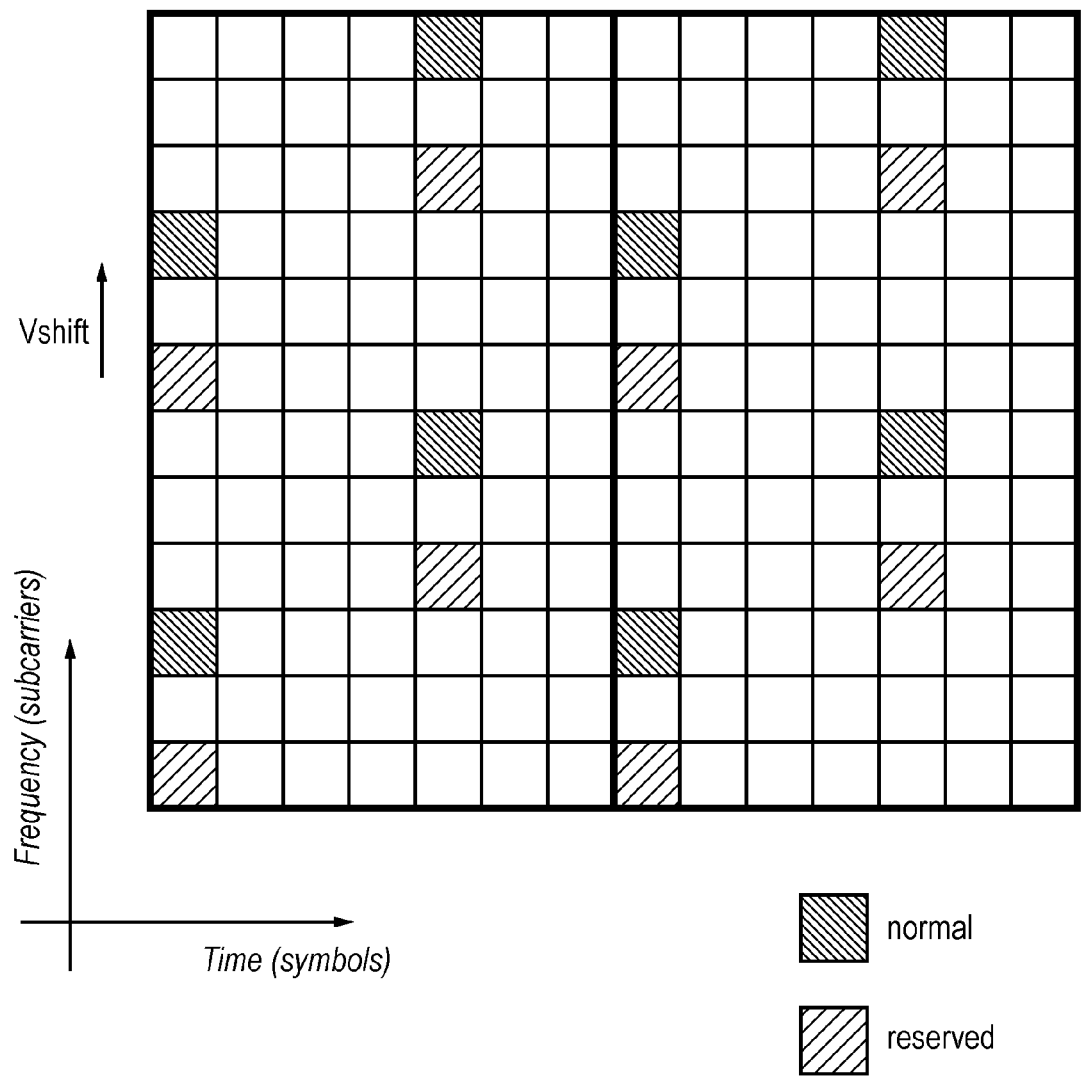
FIG. 12 compares "normal" and "reserved" configurations of CRS resource elements (in a cases where one antenna port is used), the CRS in the reserved configuration being generated using a PCI other than the PCI inferred from synchronisation signalling, in accordance with a fourth embodiment.

In a fourth embodiment, a type of perturbation is applied to the CRS. As discussed above, the vertical shift of subcarriers bearing the CRS in a subframe is a function of the PCI. The UE expects CRS based on a given PCI to occur in defined resources according to a frequency offset $v_{shift}$, a modulo-6 division of PCI. This is illustrated in FIG. 12, where a frequency offset $v_{shift}=2$ is illustrated (in dark grey) alongside frequency offset $v_{shift}=0$ (light grey).

In addition, the CRS themselves are generated using an equation for sequence generation set out at TS 36.211 Section 6.10.1.1, which uses a pseudo-random sequence that is initialised with a value, which is a function of the PCI value, $N_{ID}^{cell}$. The expression for $c_{init}$ (at TS 36.211 Section 6.10.1.1), is reproduced below:

$$c_{init}=2^{10}\cdot(7\cdot(n_s+1)+l+1)\cdot(2\cdot N_{ID}^{cell}+1)+2\cdot N_{ID}^{cell}+N_{CP}.$$

The equation for sequence generation of the CRS and for the $c_{init}$ used in that equation is thus, typically, the same expression as used in sequence generation of the CSI-RS. The use of a PCI other than the PCI of the cell would result in the equation for sequence generation being initialised with a different $c_{init}$ from the $c_{init}$ specified in the relevant section of the standard. In the expression for $c_{init}$ above, $N_{ID}^{cell}$ is replaced by the reserved PCI value, $n_{ID}^{reserved}$, in both occurrences.

With 504 PCIs, 84 share each $v_{shift}$ and each PCI has exactly one defined $v_{shift}$. In this embodiment, in addition to the conventional CRS transmitted by a cell, a further CRS containing a sequence generated from a reserved PCI value is transmitted with a $v_{shift}$ different to the expected shift (derived from reserved PCI division modulo 6), so that it is transmitted in predefined resources that do not match the resources where the CRS would be expected in accordance with current specifications ("shifted" or "unexpected" resources). The dark grey shaded resource elements in FIG. 12 thus may represent resource elements which combine the use of a reserved PCI value to generate their contents and a frequency shifted resource configuration which may indicate a different PCI value again, while the light grey shaded resource elements may represent "normal", conventional CRS. In this embodiment, such unexpected or mismatched resource elements are taken to imply information regarding the operation of the cell with respect to the virtual carrier, such as those static characteristics, listed previously, including the existence of the VC.

A UE aware of the significance of any given combination of PCI value and shifted resource configuration searches the predefined resources for such an 'unexpected' CRS with a sequence generated from a reserved PCI value and, on finding one, interprets it accordingly, either obtaining a relevant configuration or abandoning the initial procedures if the combination indicates no VC support, for example.

This embodiment could require less cell ID planning than the preceding embodiments since these reserved PCIs would only ever occur in resources that could be characterised as 'wrong' according to the expectations of UEs unaware of the significance of the capability indication technique described above. A UE's response in such a case would be implementation specific. It is possible that such a mismatched CRS resource to PCI combination would never actually be detected by a UE unaware of the technique since it might not try to decode for such in the resources in which it is being transmitted, and would in any case likely be searching only for CRS carrying PCIs in the correct resources.

In variations of this embodiment, specifications can define a number of possible 'shifted' resources (up to five in current specifications) in which CRS according to a reserved PCI can be transmitted, and the joint combination which a UE detects implies the configuration of the VC. This would have a higher blind search load for a UE but would create greater flexibility in the system.

For the purposes of the present disclosure, it is noted that the LTE standard does not define a "subframe configuration" for CRS. However, CRS does imply a form of "subframe configuration" in that the CRS are present in "every subframe".

Furthermore, the additional CRS transmitted according to this embodiment need not be transmitted in every subframe or in every resource block. In this case, the subframes and resource blocks in which they are transmitted would need to be included in the predefined information (which could be provided in specification or at manufacture or initialisation). This "CRS subframe configuration" might follow the same pattern as the CSI-RS described in the context of the first to third embodiments.

The use of mismatched PCI-to-CRS resource mappings to imply matters relating to the transmission structure of the cell is an unconventional way to use the contents of CRS.

Figure 6:
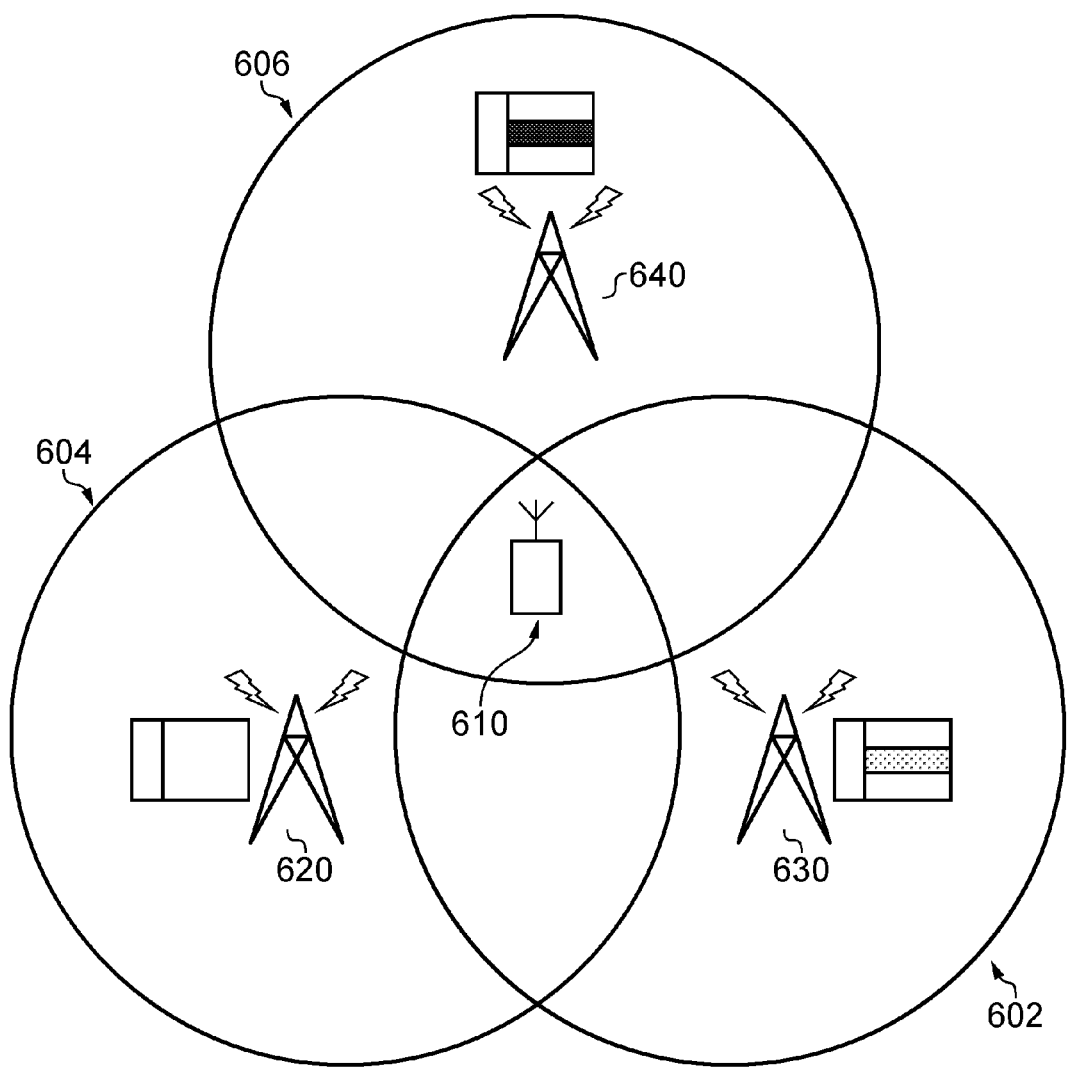
FIG. 6 provides a schematic diagram of a mobile telecommunication network illustrating certain scenarios, which embodiments address.

FIG. 6 shows a typical VC-UE 610 within the respective cells 602, 604, 606 of three eNodeBs 620, 630, 640. eNodeB 620 can offer conventional LTE but not VC functionality. ENodeB 640 can offer conventional LTE and VC functionality, but at the moment is experiencing high traffic conditions and wishes to avoid overload. ENodeB 630 can offer conventional LTE and VC functionality.

In the case of eNodeB 620, any one of the embodiments will ensure that the absence of VC functionality can be inferred from reference symbol signalling available during the cell acquisition. Likewise, while eNodeB 640 could offer conventional LTE and VC functionality under different circumstances, the available reference symbol signalling can be perturbed dynamically, so that any UE buffering reference symbols from eNodeB 640 prior to initiating cell acquisition can infer that the VC functionality is not currently available from this eNodeB.

By implementing these "perturbation" techniques, the time and processing effort expended by the VC-UE in attempting and failing to access required VC functionality can be reduced by comparison with a conventionally arranged wireless communications system.

Embodiments described hitherto concern the indication of virtual carrier capability (whether static or dynamic). VC capability is not however the only communications parameter to which the described "perturbation" techniques may be applied. Indeed, the capability indication techniques described above may equally be applied to an indication of any communications parameter for which such an indication would be advantageous at a stage prior to cell acquisition, for example whether the cell is operating network sharing.

It will be appreciated that various modifications can be made to the embodiments described above without departing from the scope of the present disclosure as defined in the appended claims. In particular although embodiments have been described with reference to an LTE mobile radio network, it will be appreciated that the present disclosure can be applied to other wireless communications systems such as GSM, 3G/UMTS, CDMA2000, WiMAX etc.

Examples of which PCIs might be reserved in embodiments include:

Even numbered PCIs (0, 2, 4, . . . )
Odd numbered PCIs (1, 3, 5, . . . )
Consecutive PCI values over a defined range
Some specific values with no particular relationship In Release 10 of the 3GPP LTE standards, UEs can have at most one CSI-RS configuration: Release 11 relaxes this requirement and permits any number of configurations. It is noted that the techniques described above do not disturb that fact since the CSI-RS configuration(s) for normal purposes can be sent by the usual methods, i.e. RRC signalling.

The UE would need to separately search during the initial acquisition process for the reserved possibilities among the CSI-RS configurations to see which if any embodiment is in operation. The RRC-configured CSI-RS configuration(s) can be sent independently later, and may be the same or different to the reserved CSI-RS configuration(s) used in the first three embodiments.

Furthermore the embodiments described above relating to CRS and CSI-RS can be used independently or in combination without departing from the scope of the present disclosure as defined in the appended claims. Two sets of RS, not necessarily the same type can coexist. Specifically, the disclosure also encompasses a scenario which combines the second embodiment where no "normal" conventional CSI-RS may be configured at all with the fourth: the network may transmit just the reserved CSI-RS configuration and along with CRS as described in the fourth embodiment.

The reservations in PCI, CSI-RS configurations and mismatched CRS resources discussed in the respective embodiments above may be specified beforehand so that the UE may be configured to search for such indications before it has obtained an RRC connection to the cell, and in order to intercept and, if appropriate, abandon the initial cell procedures as soon as possible. Alternatively, the disclosure could be implemented in compatible UEs by agreement between a network operator and a terminal manufacturer.

The term MTC terminal as used herein can be replaced with user equipment (UE), mobile communications device, terminal device etc. Furthermore, the term base station refers to any wireless network entity that provides UEs with an air interface to a cellular telecommunications network: while the term has been used interchangeably with e-NodeB in the foregoing it should be understood that it encompasses equivalent network entities in LTE and alternative radio access architectures including: eNode-Bs; Node-Bs, pico-, femto- and micro base station equipment, relays; repeaters etc.

The reader will appreciate that the various exemplary embodiments are not in general mutually exclusive and features of each can be interchanged and combined where appropriate.

Annex 1: Virtual Carriers

The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]). Certain aspects of the concept of virtual carriers are set out below. In this section, the following abbreviations are frequently adopted: virtual carrier—VC, host carrier—HC, user equipment—UE, resource block—RB, radio frequency—RF, and baseband—BB.

Like conventional OFDM, the virtual carrier concept has a plurality of subcarriers disposed at predetermined offsets from a central frequency: the central frequency thus characterises the entire virtual carrier.

Typical virtual carrier bandwidth is six resource blocks, (i.e. 72 sub-carriers) which is in line with minimum 3GPP bandwidth in LTE. However, as will be seen in the following description, the bandwidth of VC is by no means restricted to 6 RBs.

In line with Release 8 of the 3GPP standard for LTE (REL8 LTE), VC resources are typically located in the resource blocks centred on the host carrier centre frequency and symmetrically allocated (at either side of that HC centre frequency) regardless of system bandwidth.

Figure 4A:
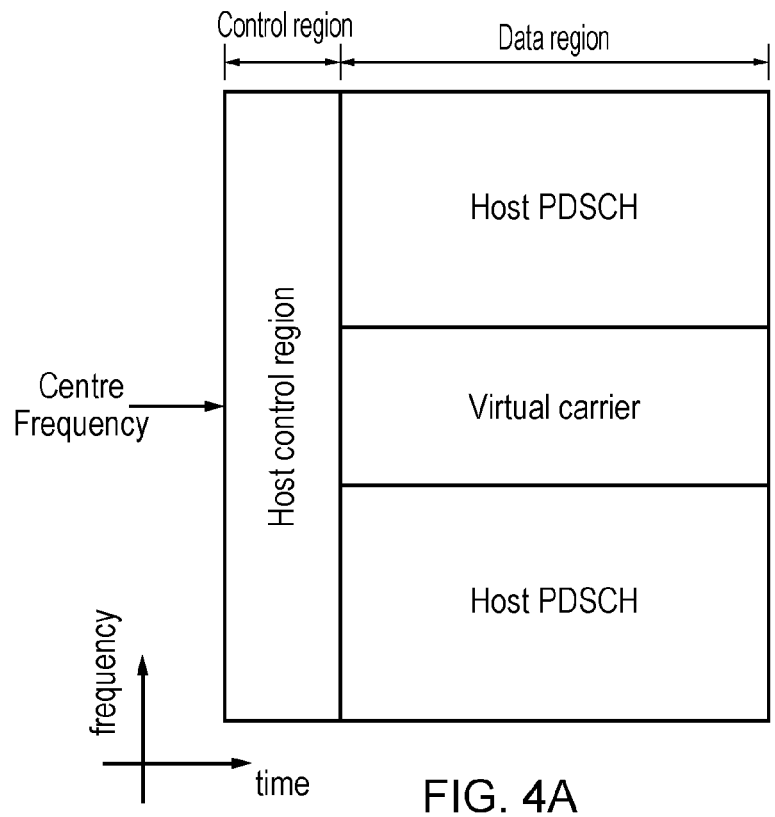
FIG. 4A provides a schematic diagram illustrating an example of a LTE downlink radio sub-frame having a virtual carrier.
Figure 4B:
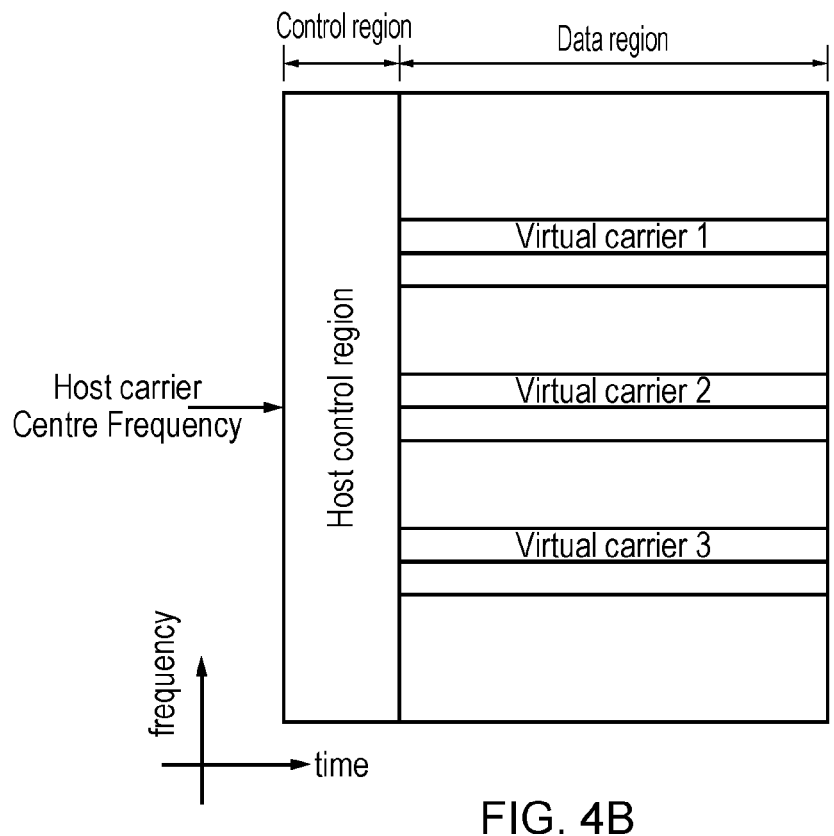
FIG. 4B provides a schematic diagram illustrating an example of a LTE downlink radio sub-frame in which a plurality of virtual carriers have been inserted at a number of frequencies of the host carrier.

FIG. 4 is a schematic diagram of a grid which illustrates the structure of a downlink LTE sub-frame with a virtual carrier 401 occupying the resource blocks centred on the host carrier centre frequency. The virtual carrier central frequency 403 is selected to be the central frequency 401 of the host carrier.

In keeping with a conventional LTE downlink sub-frame illustrated in FIG. 3, the first n symbols form the control region 300 which is reserved for the transmission of downlink control data such as data transmitted on the PDCCH, PCFICH or PHICH.

The signals on the virtual carrier 401 are arranged such that signals transmitted by the host carrier that a terminal device operating on the host carrier would require for correct operation and expect to find in a known pre-determined location (e.g. the PSS, SSS, and PBCH in the central band 310 in FIG. 3) are maintained. The virtual carrier is configured to use resources within but logically distinct from the such host carrier resources.

As can be seen from FIG. 4, data transmitted on the virtual carrier 401 is transmitted across a limited bandwidth. This might be any suitable bandwidth smaller than that of the host carrier. In the example shown in FIG. 4, the virtual carrier is transmitted across a bandwidth comprising 12 blocks of 12 sub-carriers (i.e. 144 sub-carriers), which is equivalent to a 2.16 MHz transmission bandwidth. Accordingly, a terminal using the virtual carrier 401 need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

Before a conventional LTE terminal can begin transmitting and receiving data in a cell, it first camps on to the cell. Similarly, an adapted camp-on process can be provided for terminals using the virtual carrier. A suitable camp-on process for virtual carriers is described in detail in GB 1113801.3 [10]: this camp-on process is incorporated herein by reference.

As described in GB 1113801.3 [10], both "conventional LTE" and virtual carrier implementations could conveniently include location information for the virtual carrier within the PBCH, which already carries the Master Information Block (MIB) in the host carrier centre band. Alternatively, virtual carrier location information could be provided in the centre band, but outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

While the virtual carrier location information, if provided, can be provided elsewhere in the host carrier, it may be advantageous to provide it in the centre band, for example because a virtual carrier terminal may configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). This process too is discussed in detail in GB 1113801.3 [10].

The reader will readily appreciate that multiple instances of virtual channels may be implemented at different frequency ranges within the same cell. FIG. 5 shows a schematic diagram of a downlink LTE subframe exhibiting three different virtual channels.

The following numbered clauses provide further example aspects and features of the present technique:

1. A mobile terminal for deriving an indication of a communications parameter associated with a wireless communications system, the wireless communications system comprising:

one or more base stations, each of which includes a transmitter configured to provide a wireless access interface for communicating data to terminals, the wireless access interface providing a plurality of communications resource elements, the communications resource elements being assembled in a plurality of time divided radio frames, a first subset of the resource elements in each radio frame carrying at least one synchronisation signal, the synchronisation signals for a base station being associated with a first identity number, and a second subset of the resource elements in each radio frame carrying reference signals comprising reference symbols, the second subset being divided into a plurality of discrete configurations, including a first configuration and a second configuration, the reference symbols in the first configuration having at least one property that varies according to the first identity number, the mobile terminal having:

a receiver for receiving at least some of the communications resource elements of the wireless access interface and a processor for processing at least some of the received communications resource elements; wherein, in operation, the processor determines the values of at least one property of the reference symbols present in the received communications resource elements; the value of the communications parameter being inferred from at least one property of the reference symbols in the second configuration.

2. A mobile terminal according to clause 1, wherein the communications parameter inferred is a static characteristic of the wireless access interface provided by the base station.

3. A mobile terminal according to clause 2, wherein the static characteristic is the capability of the base station to provide a narrowband carrier, the narrowband carrier occupying a third subset of the resource elements of the radio frame and having a bandwidth which is less than the bandwidth supplied by the wireless access interface.

4. A mobile terminal according to clauses 1 to 3, wherein at least one property of the reference symbols is the reference signal configuration to which respective received reference symbols belong, and the value of the communications parameter is inferred from the presence of reference symbols in the second configuration.

5. A mobile terminal according to clause 4, wherein the value of the communications parameter is inferred from a distinction between the second configuration and the first configuration.

6. A mobile terminal according to clause 4 or 5, wherein the second configuration is a predetermined one of the plurality of discrete configurations.

7. A mobile terminal according to clause 6, wherein the second configuration is reserved for use in indicating values of communications parameters.

8. A mobile terminal according to clauses 1 to 7, wherein at least one property of the reference symbols is a reference signal sequence, and the value of the at least one of the reference symbol properties determined by the processor includes a value corresponding to the reference signal sequence and wherein the inference of the communications parameter value depends upon the reference signal sequence in the second configuration.

9. A mobile terminal according to clause 8, wherein the reference signal sequence varies according to a second identity number different from the first identity number, and wherein the value of the communications parameter is inferred from the value of the second identity number used in the second configuration.

10. A mobile terminal according to clause 9, wherein the value of the communications parameter is inferred from a distinction between the second identity number and the first identity number used in the first configuration.

11. A mobile terminal according to clause 9 or 10, wherein the reference signal sequence in the second configuration is generated as a function of the second identity number.

12. A mobile terminal according to clauses 1 to 11, wherein at least one property of the reference signals is a reference signal subframe configuration, and the value of the at least one of the reference symbol properties determined by the processor is a value corresponding to the reference signal subframe configuration and wherein the property of the reference symbols in the second configuration, from which the value of the communications parameter is inferred, is the presence of reference symbols in a sub-frame configuration different from the sub-frame configuration to which the first configuration belongs.

13. A mobile terminal according to clauses 1 to 12, wherein the at least one property of the reference symbols is a combination of at least two of:
  a reference signal subframe configuration;
  a reference signal configuration; and
  a reference signal sequence;
the communications parameter being inferred from said combination of properties of the reference symbols in the second configuration.

14. A mobile terminal according to any preceding clause, wherein the at least one property of the reference symbols in the first configuration that varies according to the first identity number is the reference signal sequence, the first configuration comprising reference signals in a first reference signal sequence generated as a function of the first identity number, and wherein the second configuration comprises reference signals in a second reference signal sequence distinct from the first reference signal sequence, the second reference signal sequence being generated using the second identity number, the second identity number corresponding to a reserved identity number.

15. A mobile terminal according to clause 14, wherein the first reference signal sequence is generated in a reference signal algorithm, using the first identity number as a seed and the second reference signal sequence is generated in the reference signal algorithm, using the second identity number as a seed.

16. A mobile terminal according to any preceding clause, wherein the reference symbols in the second subset include channel-state information reference signals, CSI-RS.

17. A mobile terminal according to any preceding clause, wherein the reference symbols in the second subset include cell-specific reference signals, CRS.

18. A mobile terminal according to clause 17, wherein at least one property of the reference signals is the cell-specific reference signal configuration to which respective received reference symbols belong, wherein the second configuration is selected from the plurality of discrete configurations in accordance with a second identity number, and wherein the reference symbols in the second configuration are generated using the second identity number, the value of the communications parameter being inferred by determining that the identity number used to generate the cell-specific reference signals in the second configuration differs from the first identity number.

19. A mobile terminal according to clause 18, wherein the second identity number is a predetermined identity number, reserved for use in indicating values of communications parameters.

20. A method for deriving an indication of a communications parameter in a wireless communications system configured to provide a wireless access interface for communicating data to terminals,
  the wireless access interface providing a plurality of communications resource elements,
  the communications resource elements being assembled in a plurality of time divided radio frames,
  a first subset of the resource elements in each radio frame carrying at least one synchronisation signal, the synchronisation signals for a base station being associated with a first identity number, and
  a second subset of the resource elements in each radio frame carrying reference symbols, the second subset being divided into a plurality of discrete configurations, including a first configuration and a second configuration, the reference symbols in the first configuration having at least one property that varies according to the first identity number,
  the method comprising:
  receiving at least some of the communications resource elements of the wireless access interface;
  processing at least some of the received communications resource elements to determine the values of at least one property of the reference symbols present in the received communications resource elements; and
  inferring the value of the communications parameter from at least one property of the reference symbols in the second configuration.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1113801.3

The invention claimed is:

1. A mobile terminal comprising:
a receiver configured to receive one or more of a plurality of communications resource elements provided by a wireless access interface of one or more base stations in a wireless communications system,
wherein the communications resource elements are assembled in a plurality of time divided radio frames,
wherein each of the radio frames includes a first subset of the communications resource elements having at least one synchronization signal for the one or more base stations, wherein the at least one synchronization signal is associated with a first identity number that is a first physical-layer cell identity,
wherein each of the radio frames includes a second subset of the communications resource elements having reference signals that include reference symbols, wherein the second subset of the communications resource elements is divided into a plurality of discrete configurations including a first configuration and a second configuration, wherein reference symbols in the first configuration include at least one property that varies according to the first identity number, wherein reference symbols in the second configuration include at least one property that varies according to a second identity number that is a second physical-layer cell identity, and wherein the first identity number is different from the second identity number; and
a processor configured to:
process the received one or more communications resource elements;
determine values of at least one property of the reference symbols present in the received communications resource elements; and
derive an indication of a communications parameter associated with the wireless communications system by inferring a value of the communications parameter from at least one property of the reference symbols in the second configuration.

2. The mobile terminal as claimed in claim 1, wherein the inferred communications parameter is a static characteristic of the wireless access interface provided by the base station.

3. The mobile terminal as claimed in claim 2, wherein the static characteristic is a capability of the base station to provide a narrowband carrier, the narrowband carrier occupying a third subset of the communications resource elements of the radio frame and having a bandwidth that is less than a bandwidth provided by the wireless access interface.

4. The mobile terminal as claimed in claim 1, wherein at least one property of the reference symbols is a reference signal configuration to which respective received reference symbols belong, and the value of the communications parameter is inferred from the presence of reference symbols in the second configuration.

5. The mobile terminal as claimed in claim 4, wherein the value of the communications parameter is inferred from a distinction between the second configuration and the first configuration.

6. The mobile terminal as claimed in claim 4, wherein the second configuration is a predetermined one of the plurality of discrete configurations.

7. The mobile terminal as claimed in claim 6, wherein the second configuration is reserved for use in indicating values of communications parameters.

8. The mobile terminal as claimed in claim 1, wherein at least one property of the reference symbols is a reference signal sequence, and the value of the at least one of the reference symbol properties determined by the processor includes a value corresponding to the reference signal sequence, and wherein the value of the communications parameter is inferred based on the reference signal sequence in the second configuration.

9. The mobile terminal as claimed in claim 8, wherein the reference signal sequence varies according to the second identity number, and wherein the value of the communications parameter is inferred from the value of the second identity number used in the second configuration.

10. The mobile terminal as claimed in claim 9, wherein the value of the communications parameter is inferred from a distinction between the second identity number and the first identity number used in the first configuration.

11. The mobile terminal as claimed in claim 9, wherein the reference signal sequence in the second configuration is generated as a function of the second identity number.

12. The mobile terminal as claimed in claim 1, wherein at least one property of the reference signals is a reference signal subframe configuration, and the value of the at least one of the reference symbol properties determined by the processor is a value corresponding to the reference signal subframe configuration, and
wherein the property of the reference symbols in the second configuration, from which the value of the communications parameter is inferred, is a presence of reference symbols in a sub-frame configuration different from the sub-frame configuration to which the first configuration belongs.

13. The mobile terminal as claimed in claim 1, wherein the at least one property of the reference symbols is a combination of at least two of:
a reference signal subframe configuration;
a reference signal configuration; and
a reference signal sequence,
wherein the communications parameter is inferred from said combination of properties of the reference symbols in the second configuration.

14. The mobile terminal as claimed in claim 1, wherein the at least one property of the reference symbols in the first configuration that varies according to the first identity number is the reference signal sequence, the first configuration comprising reference signals in a first reference signal sequence generated as a function of the first identity number, and
wherein the second configuration comprises reference signals in a second reference signal sequence distinct from the first reference signal sequence, the second reference signal sequence being generated using the second identity number, the second identity number corresponding to a reserved identity number.

15. The mobile terminal as claimed in claim 14, wherein the first reference signal sequence is generated in a reference signal algorithm using the first identity number as a seed, and wherein the second reference signal sequence is generated in the reference signal algorithm using the second identity number as a seed.

16. The mobile terminal as claimed in claim 1, wherein the reference symbols in the second subset include channel-state information reference signals (CSI-RS).

17. The mobile terminal as claimed in claim 1, wherein the reference symbols in the second subset include cell-specific reference signals (CRS).

18. The mobile terminal as claimed in claim 17, wherein at least one property of the reference signals is the cell-specific reference signal configuration to which respective received reference symbols belong, wherein the second configuration is selected from the plurality of discrete configurations in accordance with a second identity number, and wherein the reference symbols in the second configuration are generated using the second identity number, the value of the communications parameter being inferred by determining that the identity number used to generate the cell-specific reference signals in the second configuration differs from the first identity number.

19. The mobile terminal as claimed in claim 18, wherein the second identity number is a predetermined identity number, reserved for use in indicating values of communications parameters.

20. A method comprising:
  receiving one or more of a plurality of communications resource elements provided by a wireless access interface of one or more base stations in a wireless communications system,
  wherein the communications resource elements are assembled in a plurality of time divided radio frames,
  wherein each of the radio frames includes a first subset of the communications resource elements having at least one synchronization signal for the one or more base stations, wherein the at least one synchronization signal is associated with a first identity number that is a first physical-layer cell identity,
  wherein each of the radio frames includes a second subset of the communications resource elements having reference signals that include reference symbols, wherein the second subset of the communications resource elements is divided into a plurality of discrete configurations including a first configuration and a second configuration, wherein reference symbols in the first configuration include at least one property that varies according to the first identity number, wherein reference symbols in the second configuration include at least one property that varies according to a second identity number that is a second physical-layer cell identity, and wherein the first identity number is different from the second identity number,
  processing the received one or more communications resource elements;
  determining values of at least one property of the reference symbols present in the received communications resource elements; and
  deriving an indication of a communications parameter associated with the wireless communications system by inferring a value of the communications parameter from at least one property of the reference symbols in the second configuration.

* * * * *